(12) United States Patent
Wang et al.

(10) Patent No.: US 8,178,240 B2
(45) Date of Patent: May 15, 2012

(54) POSITIVE ELECTRODE AND METHOD FOR MANUFACTURING THE SAME AND LITHIUM BATTERY UTILIZING THE SAME

(75) Inventors: Fu-Ming Wang, Sijhih (TW);
Chang-Rung Yang, Taiping (TW);
Chen-Chung Chen, Wuqi Town (TW);
Kuo Feng Chiu, Taichung (TW)

(73) Assignee: Industrial Technology Research Institute (TW)

( * ) Notice: Subject to any disclaimer, the term of this patent is extended or adjusted under 35 U.S.C. 154(b) by 495 days.

(21) Appl. No.: 12/362,852

(22) Filed: Jan. 30, 2009

(65) Prior Publication Data

US 2010/0086851 A1 Apr. 8, 2010

(30) Foreign Application Priority Data

Oct. 3, 2008 (TW) ................................ 97138181 A (51) Int. Cl.
*H01M 4/12* (2006.01)

(52) U.S. Cl. ..................................... 429/231.1; 427/180

(58) Field of Classification Search ............... 429/231.1; 427/180
See application file for complete search history.

(56) References Cited

U.S. PATENT DOCUMENTS 5,695,893 A * 12/1997 Arai et al. ..................... 429/221
6,835,493 B2 * 12/2004 Zhang et al. .................. 429/162

FOREIGN PATENT DOCUMENTS

| JP | 10-041237 | 2/1998 |
| JP | 2001-316817 | 11/2001 |
| JP | 2004-022988 | 1/2004 |
| JP | 2005-248322 | 9/2005 |
| JP | 2006-505128 | 2/2006 |

OTHER PUBLICATIONS

Chinese Office Action from corresponding Chinese Application No. 200810175118.2.
Office Action and English Translation issued on Feb. 7, 2012 in corresponding application No. JP2009-115433.

* cited by examiner

*Primary Examiner* — Stuart Hendrickson
(74) *Attorney, Agent, or Firm* — Lowe Hauptman Ham & Berner, LLP (57) ABSTRACT

Disclosed is a positive electrode applied in lithium battery and method for manufacturing the same. First, a lithium alloy oxide layer is formed on a substrate. Subsequently, an additional high density and low energy plasma treatment is processed, such that the lithium alloy oxide layer has a top surface composed of uniform, dense, and inter-necked nano grains, and the in-side/bottom grains of the oxide layer remain unchanged. According to experiments, the positive electrode with such properties has higher capacity and longer cycle lifetime, thereby improving the lithium battery performance.

5 Claims, 13 Drawing Sheets

POSITIVE ELECTRODE AND METHOD FOR MANUFACTURING THE SAME AND LITHIUM BATTERY UTILIZING THE SAME

CROSS REFERENCE TO RELATED APPLICATIONS

This Application claims priority of Taiwan Patent Application No. 097138181, filed on Oct. 3, 2008, the entirety of which is incorporated by reference herein.

BACKGROUND OF THE INVENTION

1. Field of the Invention

The present invention relates to a lithium battery, and in particular relates to the positive electrode thereof and method for manufacturing the same.

2. Description of the Related Art

Much research regarding batteries as a driving energy source has been conducted to minimize the amount or volume of batteries for, and meet sophisticated technological requirements of, portable electronic devices such as video cameras, cellular phones and laptop computers. Particularly, rechargeable lithium batteries have more energy density per unit weight, when compared to conventional lead storage batteries such as nickel-cadmium batteries, nickel-hydro batteries and nickel-zinc batteries. In addition, rechargeable lithium batteries can be recharged relatively quickly.

However, a lithium battery positive electrode is typically composed of lithium alloy oxide such as $LiNiO_2$, $LiCoO_2$, $LiMn_2O_4$, $LiFePO_4$, or $LiNi_xCo_{1-x}O_2$. The lithium battery negative electrode is typically composed of lithium, alloy of lithium and other metals, or carboceous materials such as graphite. Insignificant to the film process or powder process being selected to form the positive electrode, the top surface of the lithium alloy oxide will be uneven and non-dense with large grains. Therefore, a lithium battery positive electrode has relatively low capacity (mAh/g) and shorter cycle lifetime. Accordingly, a novel method for solving the problem for the uneven top surface of the positive electrode is called for.

BRIEF SUMMARY OF THE INVENTION

The invention provides a method for manufacturing a positive electrode, comprising: providing a substrate; forming a lithium alloy oxide layer on the substrate; and processing a plasma treatment to modify the lithium alloy oxide layer, wherein the modified lithium alloy oxide layer has uniform, dense, inter-necked nano grains on a top surface, and larger grains in a bottom structure.

The invention also provides a positive electrode, comprising: a substrate; and a lithium alloy oxide layer on the substrate, wherein the lithium alloy oxide layer has uniform, dense, inter-necked nano grains on a top surface, and larger grains in a bottom structure.

The invention further provides a lithium battery, comprising: the positive electrode described above; a negative electrode; a separator film disposed between the positive electrode and the negative electrode to define a reservoir region; a electrolyte solution in the reservoir region; and a sealant structure wrapped around the positive electrode, the negative electrode, the separator film, and the electrolyte solution.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The invention provides a method for manufacturing a positive electrode. First, a lithium alloy oxide layer is formed on a substrate. The substrate can be stainless steel, polyamide, acrylonitrile-butadiene-styrene (ABS), mica, glass, poly(ethyleneterephthalate) (PET), poly-p-phenylene-benzobisoxazole (PBO), or epoxy resin. The lithium alloy oxide is a general positive electrode material such as $LiMnO_2$, $LiMn_2O_4$, $LiCoO_2$, $LiCr_2O_7$, $Li_2CrO_4$, $LiNiO_2$, $LiFeO_2$, $LiNi_xCo_{1-x}O_2$, $LiFePO_4$, $LiMn_{0.5}Ni_{0.5}O_2$, $LiMn_{1/3}Co_{1/3}Ni_{1/3}O_2$, $LiMc_{0.5}Mn_{1.5}O_4$, or combinations thereof, wherein 0<x<1 and Mc is a divalent metal. There are three major types formation methods: (1) conventional powder pressing; (2) vapor deposition such as plasma enhanced chemical vapor deposition (PECVD), laser plating, low pressure chemical vapor deposition (LPCVD), rapid thermal chemical vapor deposition (RTCVD), atomic layer deposition (ALD), or physical vapor deposition (PVD), magnetron sputtering, RF sputtering, or RF plasma sputtering; and (3) chemical solution deposition such as sol-gel coating, electrochemical plating, hydrothermal deposition, and the likes. As a result, a lithium alloy oxide thick layer of 2-100 μm or a lithium alloy oxide thin film of 50 nm to 2000 nm is formed on the substrate.

In one embodiment, as the cross section of an SEM image, the lithium alloy oxide layer formed by the described process is not dense. Furthermore, the top surface of the lithium alloy oxide layer is uneven. Thus, if the top layer is directly applied as a positive electrode, capacity will be dramatically reduced after several charge/discharge cycles.

To solve the above problem, a critical process sequentially follows forming of the lithium alloy oxide layer In the invention, the lithium alloy oxide layer is applied an additional plasma treatment. Therefore, the lithium alloy oxide layer is modified to have uniform, dense, inter-necked nano grains (3 nm to 10 nm) on a top surface, and leave originally larger grains on a bottom structure. According to the ESCA and X-ray diffraction diagram, the top surface of the modified lithium alloy oxide layer has similar chemical composition and crystalline type when compared to the lithium alloy oxide layer before the plasma treatment. Thus, the plasma treatment only changes the grain size of the top surface thereof, and the lithium alloy oxide layer is not induced to conduct undesired reactions such as oxidation or reduction. The RAMAN spectrum shows that the nano crystal structure is formed on the top surface. The plasma treatment can be an RF plasma or microwave plasma treatment, and the plasma power depends on the lithium alloy oxide layer area, and the plasma power density is 0.8 W/cm$^2$ to 5 W/cm$^2$. If the power density is lower than 0.8 W/cm$^2$, insufficient power for treatment efficiency occurs. If the power density is higher than 4 W/cm$^2$, the high energy and high density plasma will destroy the surface or coarsen the grain size. The plasma treatment is preferably processed under inert gas such as argon to prevent undesired reactions. If the positive electrode contains a high oxidation state metal, such as cobalt or manganese of +3 to +4 value, the plasma treatment can be processed under oxygen. The plasma chamber may include an anode shield, inductively coupled coil, and a closed magnetic field to reach high densities with low energy, such that the plasma concentration thereof is $10^{11}$ to $10^{13}$ cm$^{-3}$ and the electron temperature thereof is 1 to 2 eV. If the plasma concentration or electron temperature thereof is too low, treatment inefficiency occurs. If the plasma concentration or electron temperature thereof is too high, the surface of the lithium alloy oxide layer may be destroyed or phase of the positive electrode may be dramatically changed, due to the high energy and high density plasma. The plasma treatment is processed for 5 to 60 minutes, wherein uniform treatment can not be accomplished in a shorter period and for a longer period, the internal portion of the positive electrode would be damaged. The plasma treatment is a low temperature process, and the positive electrode temperature is controlled to be under 150° C. A high treatment temperature (>150° C.) will destroy the flexible substrate without high-temperature resistance.

Note that although some skilled in the art form a lithium alloy oxide layer by plasma device equipment, the plasma is applied to assist deposition or sputtering. The plasma is stopped at the end of the deposition or sputtering process, and the lithium alloy oxide layer formed with the plasma has an uneven top surface. If some skilled in the art uses an additional plasma treatment to modify the lithium alloy oxide layer, it would still lack the plasma source design and the plasma factors of the invention. Therefore, the lithium alloy oxide layer is different from the conventional plasma treatment, wherein cell performance is not enhanced due to the grains of the positive electrode being coarsened, phase changed, and destroyed.

In one embodiment, the substrate is a rigid material such as a stainless material. The rigid substrate can be annealed at a high temperature, such as 300° C. to 700° C., before or after the plasma treatment. If the anneal temperature is less than 300° C., the substrate has poor crystalline phase and lower capacity. If the anneal temperature is higher than 700° C., the substrate will have a high temperature mixed phase.

Figure 1:
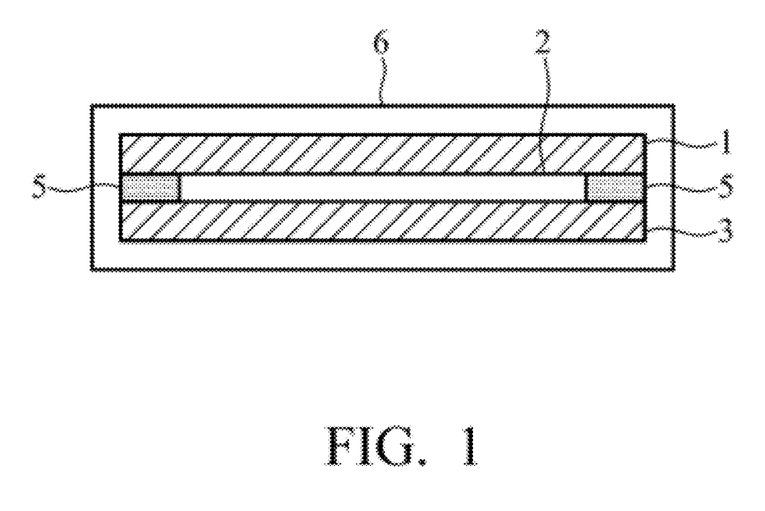
FIG. 1 is cross section of a lithium battery in one example of the invention.

The lithium alloy oxide layer modified by the invention can be used as positive electrode in, but not limited to a lithium battery as shown in FIG. 1. In FIG. 1, a separator film 5 is disposed between a positive electrode 1 and a negative electrode 3 to define a reservoir region 2 to store an electrolyte solution. In addition, the positive electrode 1, the negative electrode 3, the separator film 5, and the electrolyte solution are wrapped by a sealant structure 6.

The negative electrode 3 includes a carbon compound or a lithium alloy. The carbon compound can be carbon powder, graphite, carbon fiber, carbon nano tube, or combinations thereof. In one embodiment, the carbon compound is carbon powder with a diameter of 5 μm to 30 μm. The lithium alloy can be LiAl, LiZn, Li$_3$Bi, Li$_3$Cd, Li$_3$Sb, Li$_4$Si, Li$_{4.4}$Pb, Li$_{4.4}$Sn, LiC$_6$, Li$_3$FeN$_2$, Li$_{2.6}$Co$_{0.4}$N, Li$_{2.6}$Cu$_{0.4}$N, or combinations thereof. In addition to the above two types of materials, the negative electrode 3 may further include metal oxide such as SnO, SnO$_2$, GeO, GeO$_2$, In$_2$O, In$_2$O$_3$, PbO, PbO$_2$, Pb$_2$O$_3$, Pb$_3$O$_4$, Ag$_2$O, AgO, Ag$_2$O$_3$, Sb$_2$O$_3$, Sb$_2$O$_4$, Sb$_2$O$_5$, SiO, ZnO, CoO, NiO, FeO, or combinations thereof. Furthermore, the negative electrode 3 may include a polymer binder to enhance the mechanism properties of the electrode. Suitable polymer binders include polyvinylidene fluoride (PVDF), styrene-butadiene rubber (SBR), polyamide, melamine resin, or combinations thereof.

The separator film 5 is an insulator material such as polyethylene (PE), polypropylene (PP), or a multi-layered structure thereof (eg. PE/PP/PE).

The electrolyte solution includes an organic solvent, a lithium salt, and an additive. The organic solvent can be γ-butyrolactone (GBL), ethylene carbonate (EC), propylene carbonate (PC), diethylene carbonate (DEC), propyl acetate (PA), dimethyl carbonate (DMC), ethylmethyl carbonate (EMC), or combinations thereof. The lithium salt includes LiPF$_6$, LiBF$_4$, LiAsF$_6$, LiSbF$_6$, LiClO$_4$, LiAlCl$_4$, LiGaCl$_4$, LiNO$_3$, LiC(SO$_2$CF$_3$)$_3$, LiN(SO$_2$CF$_3$)$_2$, LiSCN, LiO$_3$SCF$_2$CF$_3$, LiC$_6$F$_5$SO$_3$, LiO$_2$CCF$_3$, LiSO$_3$F, LiB(C$_6$H$_5$)$_4$, LiCF$_3$SO$_3$, or combinations thereof. The additive can typical be vinylene carbonate (VC), or further contain the maleimide series compound disclosed in Taiwan Patent Application No. 96145902.

Figure 2:
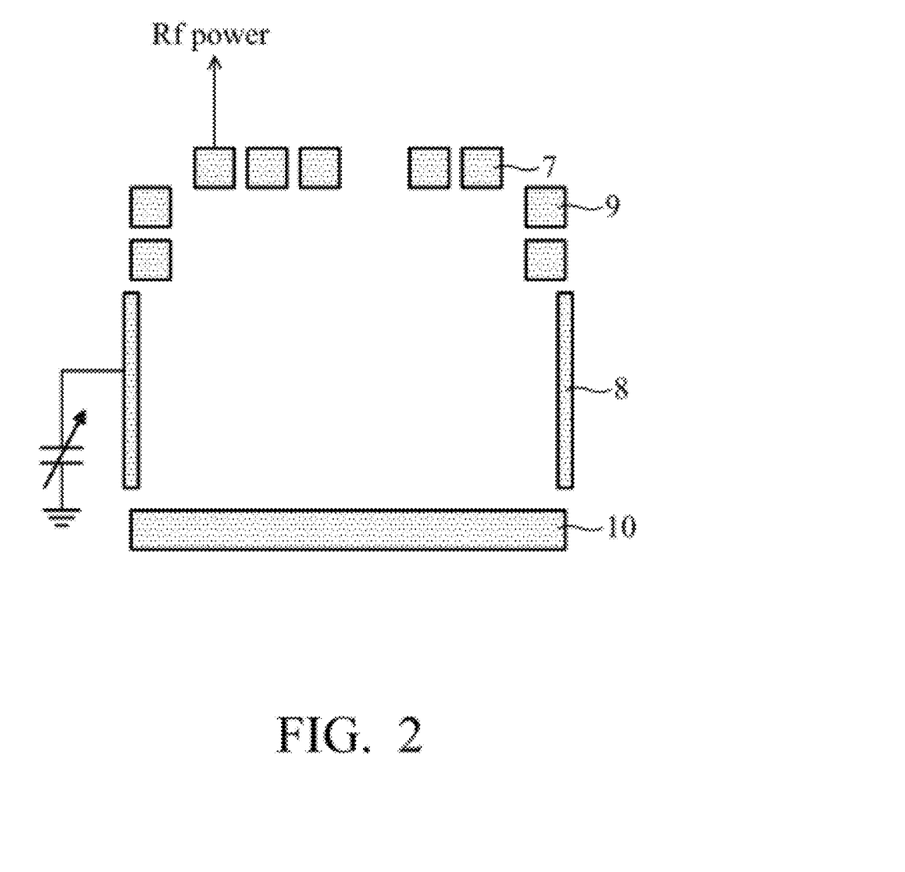
FIG. 2 is a cross section of a plasma source in one example of the invention.

The plasma source for plasma treatment in the invention is designed as shown in FIG. 2. The top electrode 7 is a single electrode plate, an electrical inductively coil, or a microwave generator. An anode shield 8 is disposed between the top and bottom electrode plates. The anode shield 8 is coupled to the ground by an adjustable capacitor. The plasma source is covered by a closed magnetic field 9, and the material for afterward treatment is set on the bottom electrode 10.

Because the positive electrode of the invention has high capacity and long cycle lifetime, a lithium battery utilizing the same will have better performance.

EXAMPLES

The Preparation of the Positive Electrode

Comparative Example 1

Figure 3A:
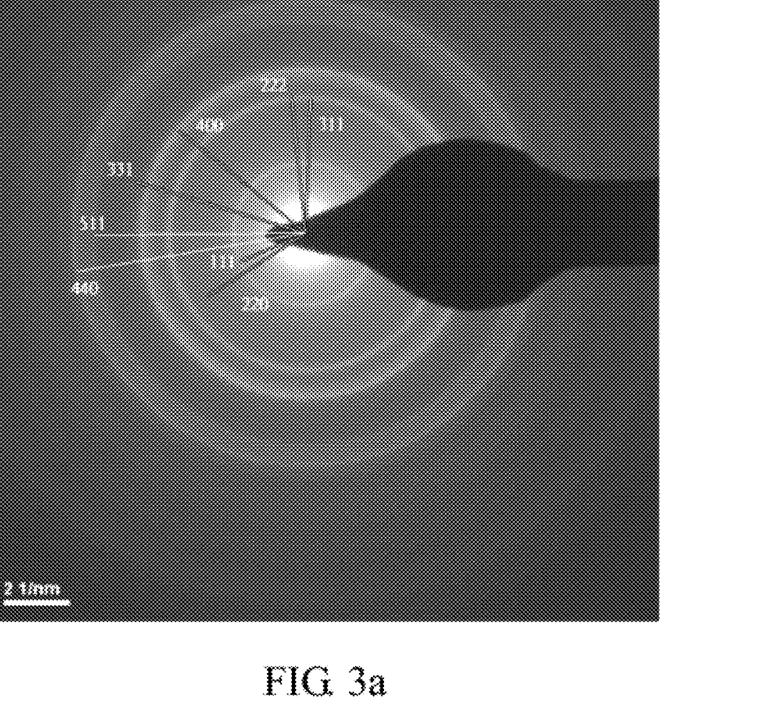
FIG. 3a is an electron diffraction spectrum of the $LiMn_2O_4$ layer in one comparative example of the invention.
Figure 4:
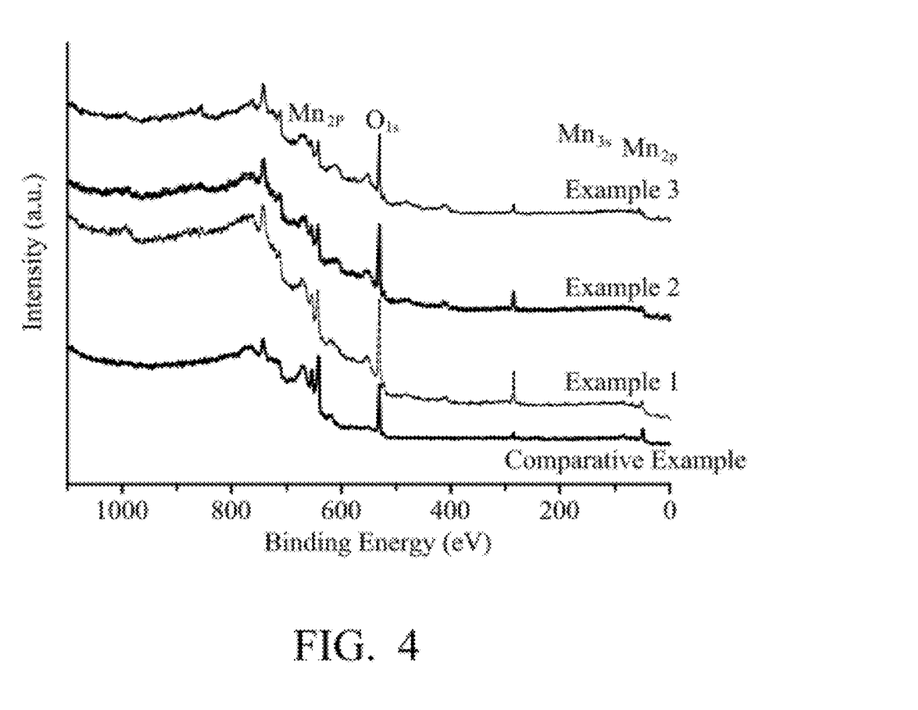
FIG. 4 is an ESCA spectrum of the $LiMn_2O_4$ layer in one comparative example and one example of the invention.
Figure 5:
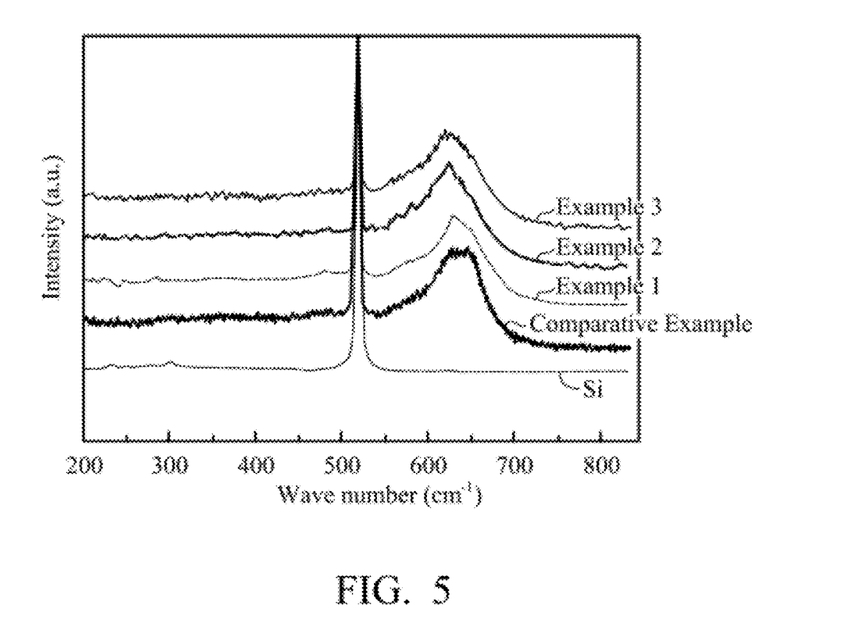
FIG. 5 is a RAMAN spectrum of the $LiMn_2O_4$ layer in one comparative example and one example of the invention.
Figure 6:
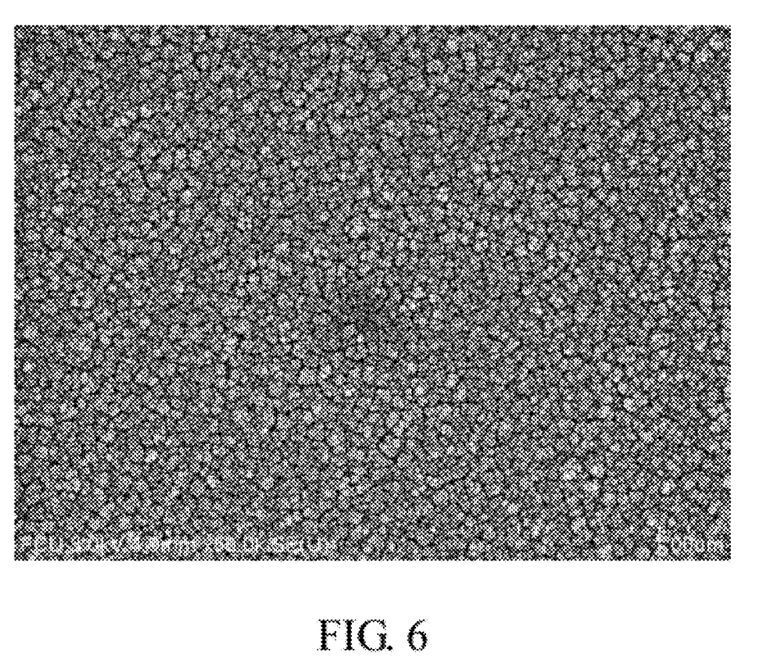
FIG. 6 is a SEM image of the top surface of the $LiMn_2O_4$ layer in one comparative example of the invention.

A 500 nm thick LiMn$_2$O$_4$ layer was magnetron sputtered on a stainless substrate, and then annealed at 600° C. The described LiMn$_2$O$_4$ surface layer was cut by a focused ion beam to be analyzed, wherein the electron diffraction spectrum thereof is shown in FIG. 3a, the ESCA spectrum thereof is shown in FIG. 4, the RAMAN spectrum thereof is shown in FIG. 5, and the SEM image of the top surface thereof is shown in FIG. 6. As shown in FIG. 6, the surface of the LiMn$_2$O$_4$ without an additional plasma treatment is uneven, and the grain thereof is rough and large.

Example 1

A 500 nm thick LiMn$_2$O$_4$ layer was magnetron sputtered on a stainless substrate, then annealed at 600° C., and treated by an Rf plasma. The power for the Rf plasma was 30 W, the treatment atmosphere was argon, the treatment temperature was lower than 100° C., and the treatment period was 30 minutes. The LiMn$_2$O$_4$ layer after the plasma treatment had an ESCA spectrum as shown in FIG. 4 and a RAMAN spectrum as shown in FIG. 5.

Example 2

Figure 3B:
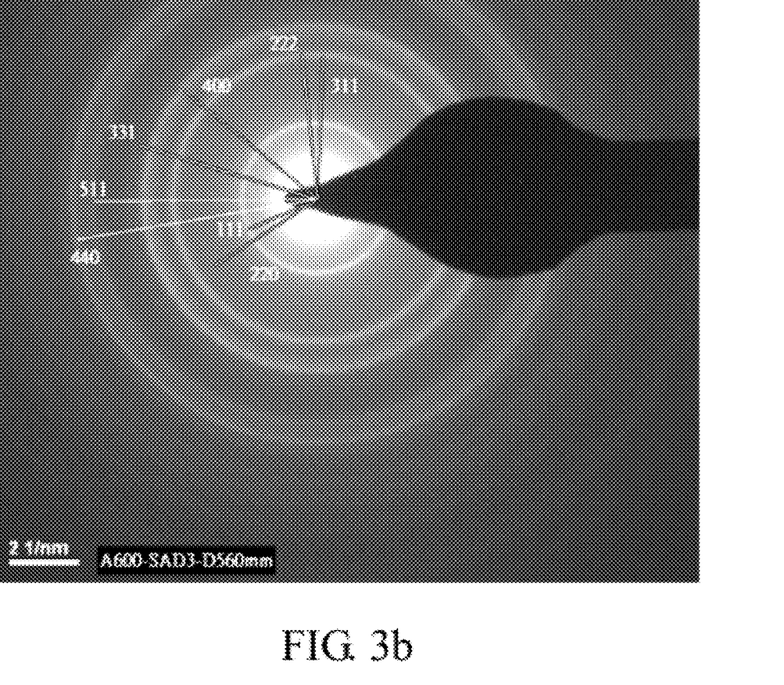
FIG. 3b is an electron diffraction spectrum of the $LiMn_2O_4$ layer in one example of the invention.
Figure 7A:
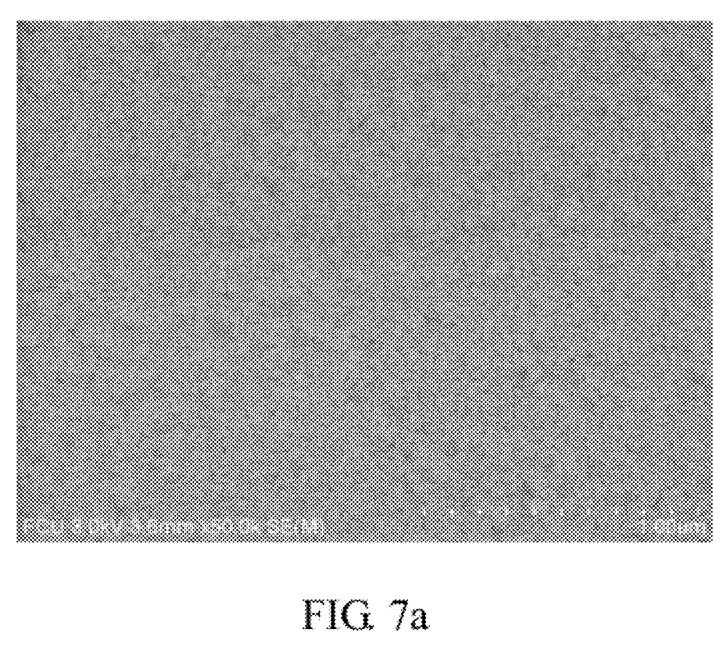
FIG. 7a is a SEM image of the top surface of the $LiMn_2O_4$ layer in one example of the invention.
Figure 7B:
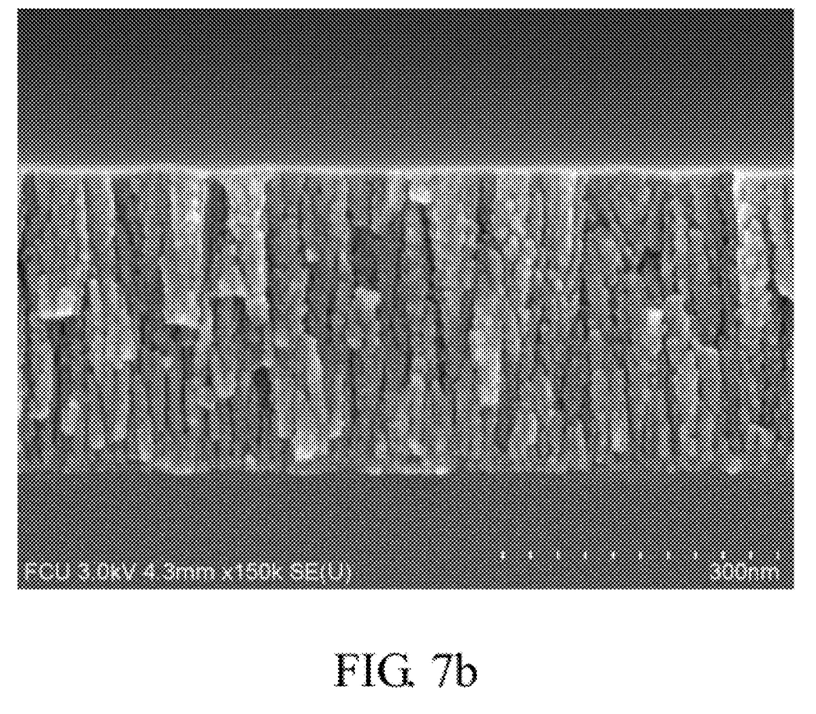
FIG. 7b is a TEM bright field image of the top surface of the $LiMn_2O_4$ layer in one example of the invention.

Example 2 is similar to Example 1, except that the power for plasma treatment was enhanced to 50 W in Example 2. The described LiMn$_2$O$_4$ surface layer after the plasma treatment was cut by a focused ion beam to be analyzed, wherein the electron diffraction spectrum thereof is shown in FIG. 3b, the ESCA spectrum thereof is shown in FIG. 4, the RAMAN spectrum thereof is shown in FIG. 5, and the SEM image of the top surface thereof is shown in FIG. 7a. As shown in FIG. 7a, the surface of the LiMn$_2$O$_4$ after the additional plasma treatment is even, dense, and planar. Because the ultra-fine and inter-necked nano grains were formed on a top surface, it is difficult to efficiently analyze the grains by a SEM. FIG. 7b shows a light field image of a similar surface portion in FIG. 3b, and it shows the inter-necked structure of the nano grains.

Example 3

Example 3 is similar to Example 1, except that the power for plasma treatment was enhanced to 80 W in Example 3. The LiMn$_2$O$_4$ layer after the plasma treatment had an ESCA spectrum as shown in FIG. 4 and a RAMAN spectrum as shown in FIG. 5.

When comparing the electron diffraction spectrum in FIG. 3 and the ESCA spectrum in FIG. 4, it is shown that the chemical composition of the surface molecules in the Comparative Example 1 and Examples 1-3 are similar. Thus, the plasma treatment will not change the molecule composition. However, the RAMAN spectrum in FIG. 5 shows the peak value between 630 to 660 cm$^{-1}$ shifts to a low wave number after the high density and low energy plasma treatment. As shown in the TEM and SEM images in FIGS. 6, 7a, and 7b, the plasma treatment efficiently improves the even and dense degree of the lithium alloy oxide layer surface. Furthermore, nano grains are induced on the top surface by the plasma treatment.

Electrical Properties (Battery Capacity and Cycle Lifetime)

Comparative Example 1

Figure 8:
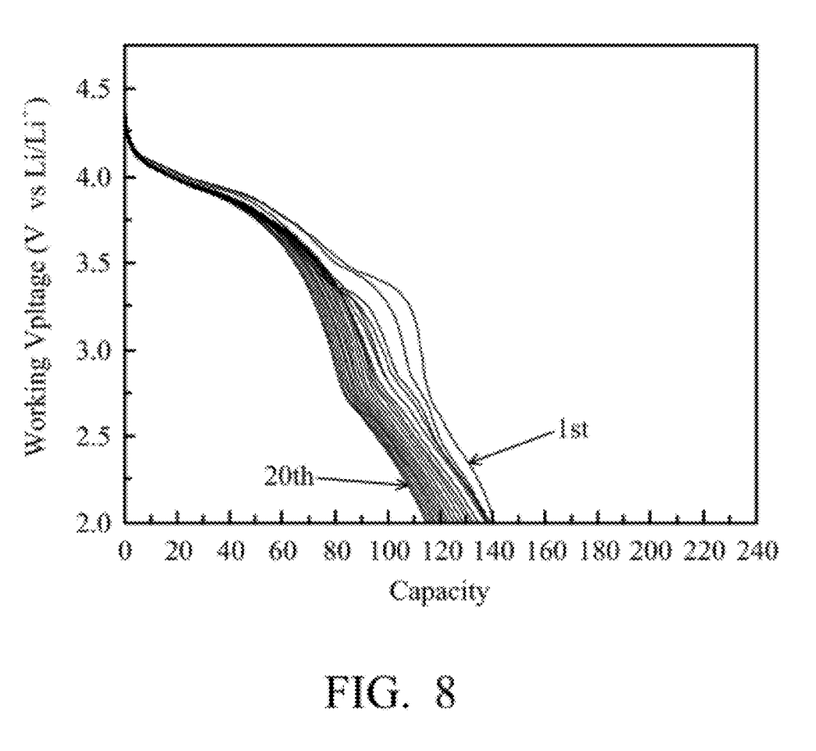
FIG. 8 is a capacity curve of charge/discharge cycling at room temperature in one comparative example of the invention.

The electrode of Comparative Example 1 was charged in a 1M LiPF$_6$ electrolyte in EC/EMC. The electrode was charged/discharged by a forward and reverse current (0.3 mA/mg) and a voltage (1.5 to 4.5 V vs. Li/Li$^+$) at room temperature (25° C.) to measure its capacity (mAh/g). As shown in FIG. 8, the first charge/discharge curve (the most right curve) had a capacity of 140 mAh/g. Following increase of the charge/discharge cycles, the curves shifted to the left side. At the 20$^{th}$ charge/discharge, the capacity thereof was only 115 mAh/g.

Figure 9:
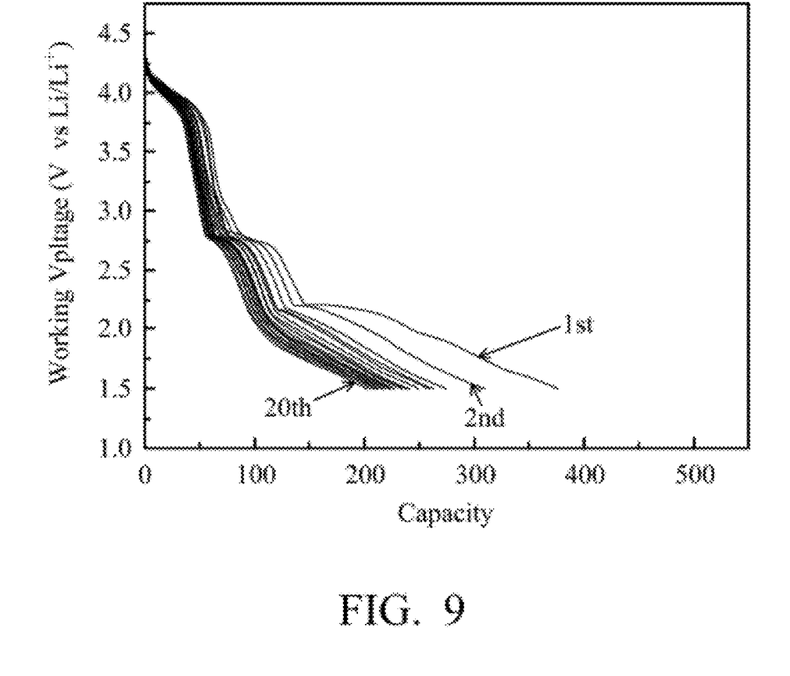
FIG. 9 is a capacity curve of charge/discharge cycling at high temperature in one comparative example of the invention.

The electrode of Comparative Example 1 was charged in a 1M LiPF$_6$ electrolyte in EC/EMC. The electrode was charged/discharged by a forward and reverse current (0.3 mA/mg) and a voltage (2.0 to 4.5 V vs. Li/Li$^+$) at a high temperature (55° C.) to measure its capacity (mAh/g). As shown in FIG. 9, the first charge/discharge curve (the most right curve) had a capacity of 400 mAh/g. Following increase of the charge/discharge cycles, the curves shifted to the left side. At the 20$^{th}$ charge/discharge, the capacity thereof was only 200 mAh/g.

Example 2

Figure 10:
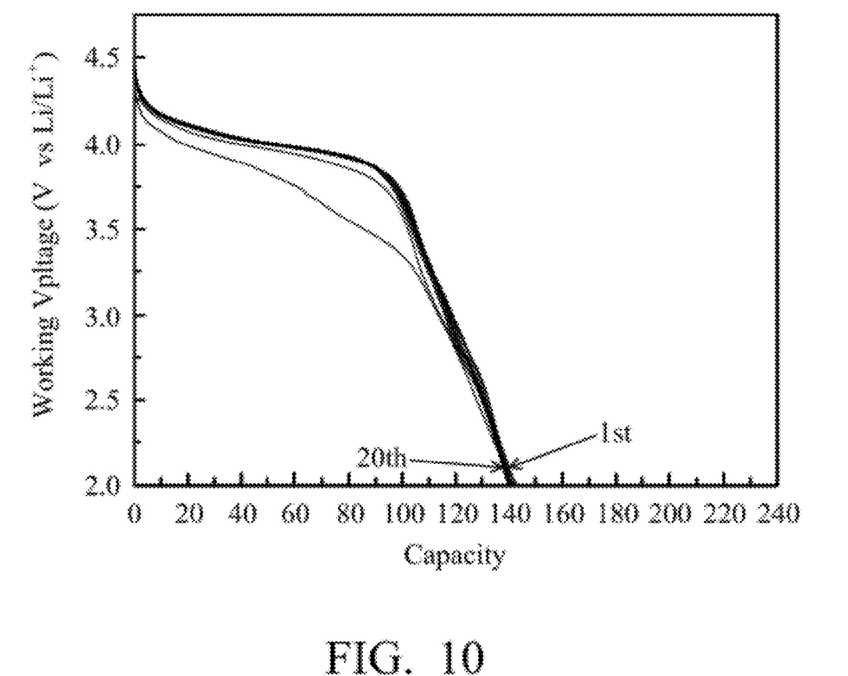
FIG. 10 is a capacity curve of charge/discharge cycling at room temperature in one example of the invention.

The electrode of Example 2 was charged in a 1M LiPF$_6$ electrolyte in EC/EMC. The electrode was charged/discharged by a forward and a reverse current (0.3 mA/mg) and a voltage (2.0 to 4.5 V vs. Li/Li$^+$) at room temperature (25° C.) to measure its capacity (mAh/g). As shown in FIG. 10, the first to twentieth charge/discharge curves were nearly overlapping and remained at 140 mAh/g.

Figure 11:
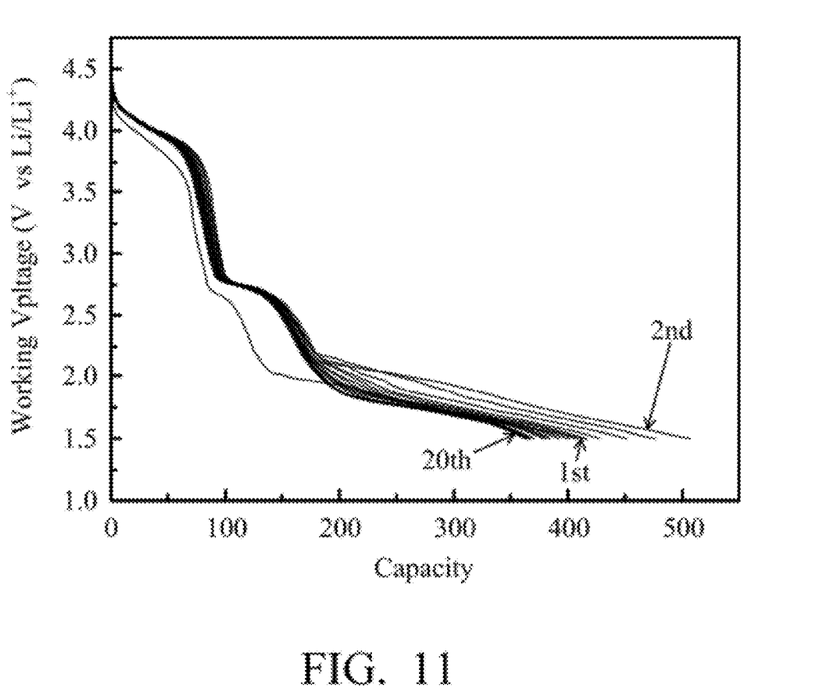
FIG. 11 is a capacity curve of charge/discharge cycling at high temperature in one example of the invention.

The electrode of Example 2 was charged in 1M LiPF$_6$ electrolyte in EC/EMC. The electrode was charged/discharged by a forward and a reverse current (0.3 mA/mg) and a voltage (1.5 to 4.5 V vs. Li/Li$^+$) at a high temperature (55° C.) to measure its capacity (mAh/g). As shown in FIG. 11, the second charge/discharge curve (the most right curve) had a capacity of 500 mAh/g higher than the first charge/discharge curve (having a capacity of 410 mAh/g). Following increase of the charge/discharge cycles, the curves shifted to left side. At the 20$^{th}$ charge/discharge, the capacity thereof remained at 370 mAh/g.

As shown when comparing FIGS. 8-11, the lithium alloy oxide layer, after surface treatment by plasma, has a longer cycle lifetime and higher capacity than the lithium alloy oxide layer before the surface treatment by plasma, when the charge/discharge is processed both at room or high temperatures.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of manufacturing a positive electrode, comprising:
   providing a substrate for the positive electrode, the substrate consisting of stainless steel, polyamide, acrylonitrile-butadiene-styrene (ABS), mica, glass, poly(ethyleneterephthalate) (PET), poly-p-phenylene-benzobisoxazole (PBO), or epoxy resin;
   forming a lithium alloy oxide layer on the substrate; and
   processing a plasma treatment to modify the lithium alloy oxide layer,
   wherein the modified lithium alloy oxide layer has uniform, dense, inter-necked nano grains on a top surface, and larger grains in a bottom structure,
   wherein the step of forming a lithium alloy oxide layer on the substrate comprises powder processing.

2. The method as claimed in claim 1, wherein the lithium alloy oxide comprises $LiMnO_2$, $LiMn_2O_4$, $LiCoO_2$, $LiCr_2O_7$, $Li_2CrO_4$, $LiNiO_2$, $LiFeO_2$, $LiNi_xCo_{1-x}O_2$, $LiFePO_4$, $LiMn_{0.5}Ni_{0.5}O_2$, $LiMn_{1/3}Co_{1/3}Ni_{1/3}O_2$, $LiMc_{0.5}Mn_{1.5}O_4$, or combinations thereof, wherein $0<x<1$ and Mc is divalent metal.

3. The method as claimed in claim 1, wherein the plasma treatment comprises utilizing a plasma chamber for providing a high density and low energy plasma, wherein the plasma chamber comprises an anode shield, an inductively coupled coil, and a closed magnetic field.

4. The method as claimed in claim 1, wherein the plasma treatment comprises utilizing a radio frequency plasma or a microwave plasma.

5. The method as claimed in claim 1, wherein the plasma treatment has a power density of 0.8 $W/cm^2$ to 5 $W/cm^2$, a density of $10^{11}$ $cm^{-3}$ to $10^{13}$ $cm^{-3}$, and an electron temperature of 1 eV to 2 eV.

* * * * *